UNITED STATES PATENT OFFICE.

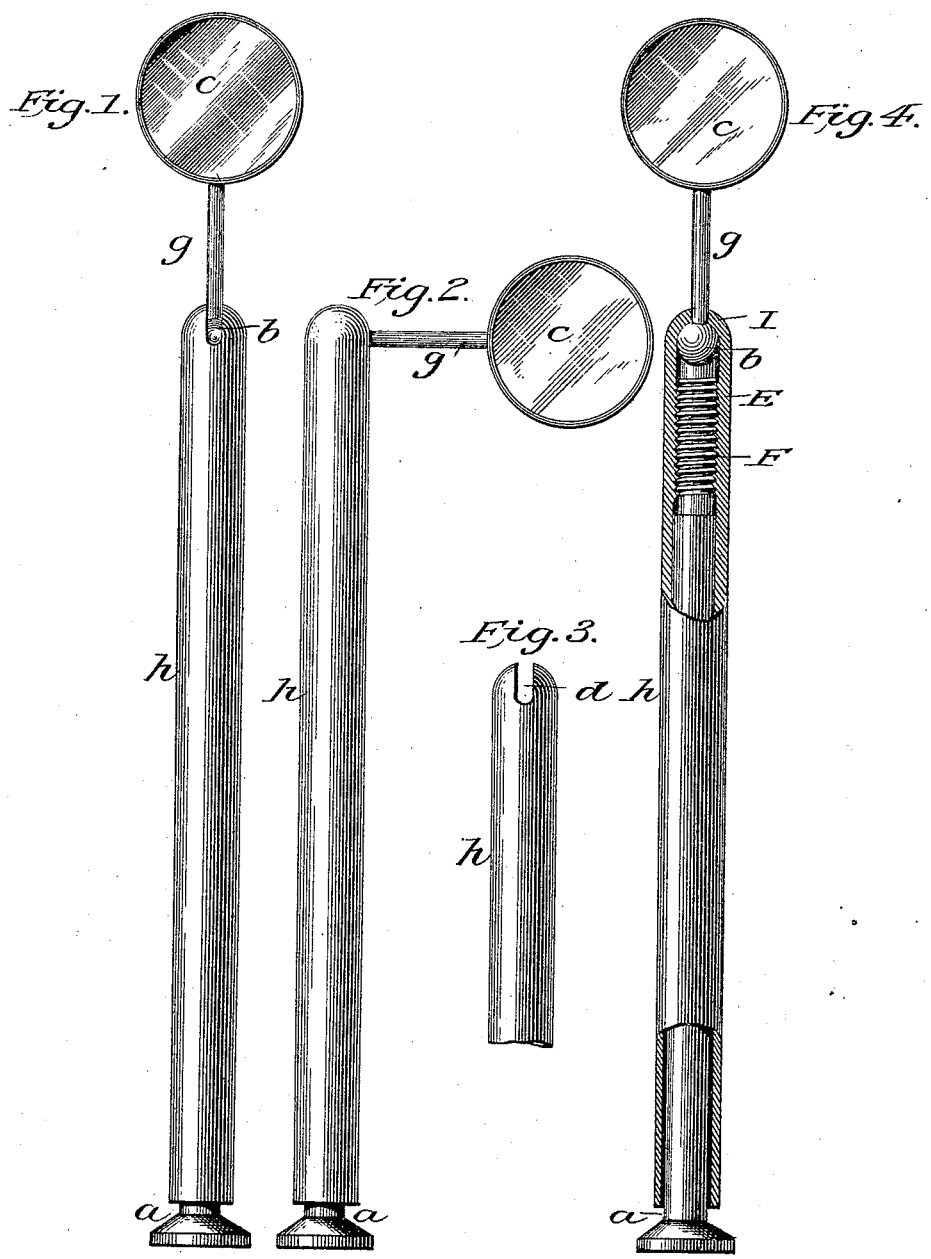

ROBERT FULTON PHILIPS, OF SAN DIEGO, CALIFORNIA.

DENTAL MOUTH-MIRROR.

SPECIFICATION forming part of Letters Patent No. 470,211, dated March 8, 1892.

Application filed August 5, 1891. Serial No. 401,805. (No model.)

*To all whom it may concern:*

Be it known that I, ROBERT FULTON PHILIPS, a citizen of the United States, residing at San Diego, in the county of San Diego, State of California, have invented a new and useful Ball-and-Socket Mouth-Mirror, of which the following is a specification.

My invention relates to improvements in ball-and-socket mouth-mirrors in which a common globular socket or hollow sphere, with a small round aperture in the top and a slot extending therefrom down one side, is used. Into this is introduced the ball to form a joint. To the ball is attached the stem, which passes up through the aperture and to which the mirror is attached. To the socket is attached the handle at a point opposite the round aperture. The handle is hollow, with concave screw-threads in the upper part near the socket to admit a screw with rod attached extending up through the handle into the socket, with a head at lower end furnishing a hold by which to enable the user to turn the screw, which, being so pressed against the ball, holds it in place. The stem and attached mirror can be moved to any angle with the handle through the slot; and the objects of my improvements are, first, to obtain greater range of movement for the mirror; second, to perfectly and securely hold the mirror in any desired position, and, third, to enable the user to alter the position of the mirror in its relation to the handle without removal from the mouth. I attain these objects by the mechanism illustrated in the accompanying drawings, in which—

Figure 1 is the entire mirror; Fig. 2, the entire mirror, showing the mirror at right angles with the handle; Fig. 3, a section of the handle, showing the slot in the socket; Fig. 4, the mirror with a section of the handle removed to show the screw.

Similar letters refer to similar parts throughout the several views.

The mirror C is attached by the stem $g$ to the ball $b$, which ball, being introduced into the socket I, forms with it the socket-joint. The slot $d$ extends from the circular opening in the top of the socket down to a point in the socket which will permit the stem to drop through it to a position at right angles with the handle $h$. The screw F passes through the handle $h$, in which is the concave screw E, into the socket I and presses upon the ball $b$. Below the handle $h$ is the head of the screw $a$, by means of which the screw is turned and the pressure upon the ball released or tightened, enabling the user to change the position of the mirror C without removal from the mouth.

I am aware that prior to my invention ball-and-socket mouth-mirrors have been made with the ball-and-socket joint connecting the handle with the mirror and allowing a movement of the mirror. I therefore do not claim such a combination, broadly; but What I do claim as my invention, and desire to secure by Letters Patent, is—

In a ball-and-socket mouth-mirror, the combination of the hollow handle $h$ with its socket I, furnished with the slot $d$, the interior shaft with head $a$, and screw F, meshing with the female screw E and serving with its concave end to hold the ball $b$, with the mirror and its shafting $g$, attached to the said ball $b$, all as and for the purpose described.

ROBERT FULTON PHILIPS.

Witnesses:
WARREN D. HAWLEY,
JULIA A. POWELL.